United States Patent [19]

Schmidt

[11] Patent Number: 4,515,433
[45] Date of Patent: May 7, 1985

[54] COUPLING ARRANGEMENT FOR OPTICAL WAVEGUIDES AND METHOD OF MANUFACTURING THE SAME

[75] Inventor: Bernhard Schmidt, Neunkirchen, Fed. Rep. of Germany

[73] Assignee: Felten & Guilleaume Carlswerk Aktiengesellschaft, Cologne, Fed. Rep. of Germany

[21] Appl. No.: 596,153

[22] Filed: Mar. 30, 1984

Related U.S. Application Data

[63] Continuation of Ser. No. 280,507, Jul. 6, 1981, abandoned.

[30] Foreign Application Priority Data

Jul. 4, 1980 [DE] Fed. Rep. of Germany ....... 3025384
Mar. 21, 1981 [DE] Fed. Rep. of Germany ....... 3111267

[51] Int. Cl.³ .............................................. G02B 7/26
[52] U.S. Cl. .................................................. 350/96.21
[58] Field of Search ................. 350/96.20, 96.21, 96.22

[56] References Cited

U.S. PATENT DOCUMENTS 4,208,095 6/1980 Malsot ............................ 350/96.21
4,368,949 1/1983 Schmidt .......................... 350/96.21

FOREIGN PATENT DOCUMENTS 2931018 2/1981 Fed. Rep. of Germany ... 350/96.20
54-34251 3/1979 Japan ................................ 350/96.22

OTHER PUBLICATIONS

Lampe, "Optical Transmission System for a 140 Mbit/S Subscriber Loop," 2nd Int. Conf. on Telec. Trans.–Into the Digital Era, London, Mar. 1981, pp. 213-216.

Primary Examiner—John Lee
Attorney, Agent, or Firm—Michael J. Striker

[57] ABSTRACT

An arrangement for coupling the ends of optical waveguides includes a housing including at least one first passage for receiving the optical waveguide ends, a second passage for accommodating a plurality of pressing bodies, and at least one slot which extends along an arcuate course between the first and second passages and separates a clamping portion situated between the passages from the remainder of the housing which is constructed as a unitary body. The partial separation of the clamping portion from the remainder of the housing body permits it to resiliently yield to the pressure exerted by the pressing bodies, and thus to clamp the waveguide end in the first passage. A plurality of the first passages may be provided in the housing body around the second passage, each connected with the second passage by an arcuate slot. Another slot may surround the first passage at a distance therefrom. The slots may be formed, subsequent to the provision of the passages, by wire erosion or by electrochemical dissolution of the material of the housing body by an appropriately shaped tool.

8 Claims, 2 Drawing Figures

COUPLING ARRANGEMENT FOR OPTICAL WAVEGUIDES AND METHOD OF MANUFACTURING THE SAME

This is a continuation of application Ser. No. 280,507 filed July 6, 1981 (now abandoned).

BACKGROUND OF THE INVENTION

The present invention relates to an arrangement for coupling the free ends of optical waveguides, particularly of optical fibers mounted in respective tubular connectors, and to a method of manufacturing a housing body for use in this arrangement.

There are already known various constructions of coupling devices for the free ends of optical waveguides and they usually include a housing consisting of one or more parts and incorporating clamping members or portions which are movable relative to one another transversely of the housing and together define a passage for receiving, in an end-to-end alignment, two waveguide end portions, or a plurality of such passages for correspondingly receiving respectively associated end portions of two pluralities of optical waveguides. The clamping members or portions are acted upon by respective pressing members which urge the clamping members or portions into clamping engagement with the waveguide end portions or the tubular or sleeve-shaped connectors thereof.

A coupling arrangement of this type is already known from the German Utility Model GM No. 79 35 570. This arrangement is constructed for coupling optical fibers the free ends of which are mounted in tubular connectors, and it includes a longitudinally and transversely slotted clamping body and a housing which surrounds this clamping body. In this construction, the clamping body is so configurated that it includes, at the region of the longitudinal slot, respective tongues which extend parallel to one another and the distance of which from one another corresponds to the width of the longitudinal slot. One of these two tongues is transversely divided, in order to achieve individual clamping of the two optical fiber connectors. The clamping body is connected to the housing either by being glued thereto, or by means of screws. However, experience with this type of arrangement has shown that, while it satisfies all of the requirements which are expected to be satisfied thereby, the satisfaction of such requirements is achieved at a relatively high expenditure.

SUMMARY OF THE INVENTION

Accordingly, it is a general object of the present invention to avoid the disadvantages of the prior art.

More particularly, it is an object of the invention to develop a coupling arrangement for optical waveguides, which is not possessed of the disadvantages of the conventional arrangements of this type.

A further object of the present invention is to so design the coupling arrangement as to be simple in construction, inexpensive to manufacture, and reliable in operation nevertheless.

Still another object of the invention is to provide a method by which the arrangement can be manufactured in a simple and inexpensive manner.

In pursuance of these objects and others which will become apparent hereafter, one feature of the present invention resides in an arrangement for coupling optical waveguide ends mounted in respective sleeve-shaped connectors, which comprises, in combination, a housing body having at least one first passage dimensioned to receive the connectors of the optical waveguide ends in an end-to-end alignment, and at least one second passage parallel to and coextensive with the first passage; means for defining in the housing body at least one slot interconnecting the first and second passages and extending along an arcuate course therebetween to partially separate a clamping portion situated between the first and second passages from the remainder of the housing body; and a plurality of pressing bodies accommodated in the second passage and operative for pressing the clamping portion into clamping engagement with the connectors accommodated in the first passage. Advantageously, the first passage is substantially cylindrical in conformity with the configurations of the sleeve-shaped connectors. It is also advantageous to give the defining means such a configuration that the slot has several bends, all oriented in the same sense, between the first and second passages.

A particular advantage of the construction described above is that the clamping body proper is integrated into the housing body, together with the member which would otherwise constitute the housing, so that one element which was provided, and necessary, in the conventional arrangements of this type, can be dispensed with and, consequently, the expenses otherwise incurred in connection with the manufacturing and assembling of these elements can be saved, without sacrificing any of the properties and functions of such previously separate elements. More particularly, the housing of the prior arrangements was considerably rigid in order to perform a protective function for the elements contained therein, while the clamping element was transversely yieldable relative to the housing to perform a reliable clamping function. In the arrangement constructed in accordance with the present invention, the portion of the housing body which envelops the passages serves to protect the pressing bodies and particularly the waveguide ends since it is substantially rigid because of the properties of the material from which the housing body is made and/or because of the thickness of the surrounding or enveloping portion, and yet the clamping portion is sufficiently yieldable to assure a sufficient clamping action because of its only partial attachment to the enveloping portion.

It has been established that the clamping action is improved when, in accordance with the present invention, the slot includes two sections, namely, a first section which interconnects the first and second passages and opens into the second passage in a predetermined direction, and a second section forming a continuation of the first section across the second passage therefrom and extending in the predetermined direction, and when this second section partially surrounds the first passage at a distance therefrom. In this manner, the elastic or resilient yieldability of the clamping portion is optimized.

So far, the present invention has been discussed as employed for coupling the ends of only two optical waveguides or fibers. However, in fiber optics, it is often desirable or necessary to couple, in pairs, the associated optical waveguide or fiber ends of two pluralities of such optical waveguides or fibers. Inasmuch as individual interconnection or coupling of the associated fibers is at least impractical if not impossible, it is proposed, in accordance with a further concept of the present invention, to employ the principles discussed above in an arrangement for coupling such associated ends of the two pluralities of optical waveguides. To this end, the housing body is provided with a plurality of the first passages regularly distributed around the second passage and each dimensioned to receive the connectors of one optical waveguide end from each of the pluralities of optical waveguides, and with a plurality of slots configured in a manner identical or similar to that discussed above and each interconnecting the second passage with one of the first passages. A special advantage of this construction can be found in the fact that this arrangement renders it possible to couple the associated optical waveguide ends with one another in an extremely space-saving manner which nevertheless renders it possible to achieve a high degree of accuracy in alignment of the waveguide ends and a considerably ruggedness of the arrangement despite its quite small dimensions.

A further advantageous feature of the present invention which is particularly useful when there are four of the first passages which are arranged at the corners of an imaginary quadrangle and when the second passage is arranged at the intersection of the diagonals thereof, resides in the fact that, in accordance with a further advantageous facet of the invention, those slots which open into associated two of the first passages merge with one another before opening into the second passage. It is also advantageous when the defining means further defines a plurality of additional slots functionally corresponding to the aforementioned second slot section, each additional slot commencing at the second passage and partially surrounding one of the first passages at a distance therefrom, and when those of the additional slots which surround associated two of the first passages merge with one another at a region of the closest distance between such associated first passages before opening into the second passage. Each of the additional slots may surround the associated first passage at least along a semi-cylindrical course. The merging of the respective slots renders it possible to advantageously utilize the available space without sacrificing the desired elasticity, while the elastic effect of the clamping portions situated between the passages and the corresponding slots can be increased to the desired level by the provision and the semi-cylindrical or semi-annular configuration of the additional slots.

The present invention also relates to a method of manufacturing the housing body of the above-discussed coupling arrangement, this method comprising the steps of forming the housing body with at least one first passage for receiving the connectors of the waveguide ends in an end-to-end alignment, and with at least one second passage parallel to and coextensive with the first passage and adapted to receive a plurality of pressing bodies; and subsequently providing in the housing body at least one slot interconnecting the first and second passages and extending along an arcuate course therebetween to partially separate a clamping portion situated between the first and second passages from the remainder of the housing body. The slots may advantageously be provided, in accordance with the present invention, by resorting to wire erosion, or to electrochemical dissolution of the material of the housing body along the arcuate course of the slot by a member having a contour conforming to the arcuate course. The use of these two currently preferred methods of formation of the slot significantly contributes to the reduction of the cost of manufacturing the coupling arrangement according to the invention.

The novel features which are considered as characteristic of the invention are set forth in particular in the appended claims. The improved clamping arrangement itself, however, both as to its construction and its mode of operation, together with additional features and advantages thereof, will be best understood upon perusal of the following detailed description of certain specific embodiments with reference to the accompanying drawing.

DETAILED DESCRIPTION OF THE PREFERRED EMBODIMENTS

Figure 1:
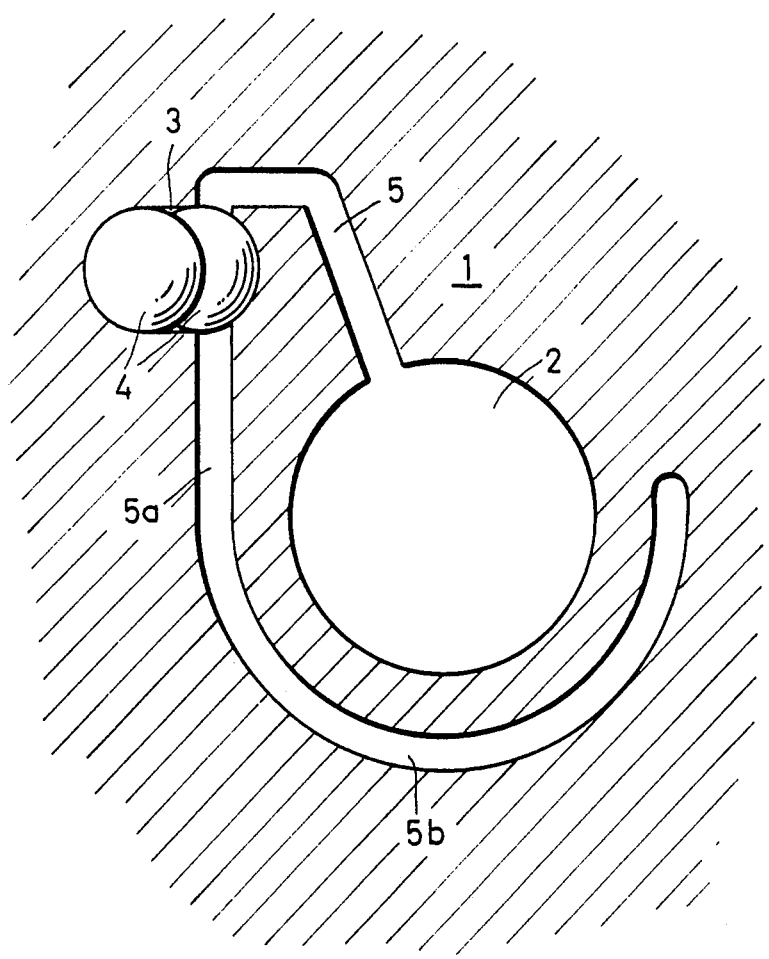
FIG. 1 is a partial cross-sectional view of an arrangement according to the present invention for coupling the free ends of two optical waveguides.

Referring now to the drawing in detail, and first to FIG. 1 thereof, it may be seen therein that the reference numeral 1 has been used to identify a housing body of a coupling arrangement for a pair of associated free ends of optical waveguides. The housing body 1 is provided with an elongated first passage 2 for receiving, in end-to-end alignment, the associated ends of the optical waveguides, which are of conventional construction and hence have been omitted from FIG. 1 of the drawing. The housing body 1 further includes a second passage 3 which extends parallel to and is coextensive with the first passage 2. The second passage 3 is separated in its middle in two parts, which renders it possible to individually clamp the two free ends, as will be discussed later. A plurality of pressing bodies 4 is accommodated in the passage 3. The pressing bodies are acted upon, during the use of the arrangement, by conventional means, such as a screw-on cap arranged at the respective end of the housing body 1, by a pressing force which causes the pressing bodies 4 to press against a portion of the housing body and force the same into engagement with the respective waveguide end accommodated in the first passage 2. As mentioned before, the second passage is separated in two parts in its middle, so that the plurality of the pressing bodies 4 is subdivided into two groups, each exerting its clamping force, via the associated clamping portion of the housing body 1, on one of the free waveguide ends, so that such ends can be individually clamped or released, as desired. The pressing means acting on the pressing bodies 4 is of a fully conventional and well known construction, so that it has not been shown in the drawing.

The housing body 1 is made of a material having only a limited resilient yieldability. To render it possible for the respective clamping portion of the housing body 1 to yield under the influence of the pressing bodies 4 to the extent necessary for securely clamping the respective waveguide end in the first passage 2, it is separated from the remainder of the housing body by an arcuate slot 5 which is shown in FIG. 1 as being bent several times in the same sense. When it is desired to increase this elastic effect, the slot 5 is extended by a slot section 5a or, if need be, by a further slot section 5b which surrounds the first passage 2 at a distance therefrom. In FIG. 1, this further slot section 5b is shown to have a semi-annular cross section.

Figure 2:
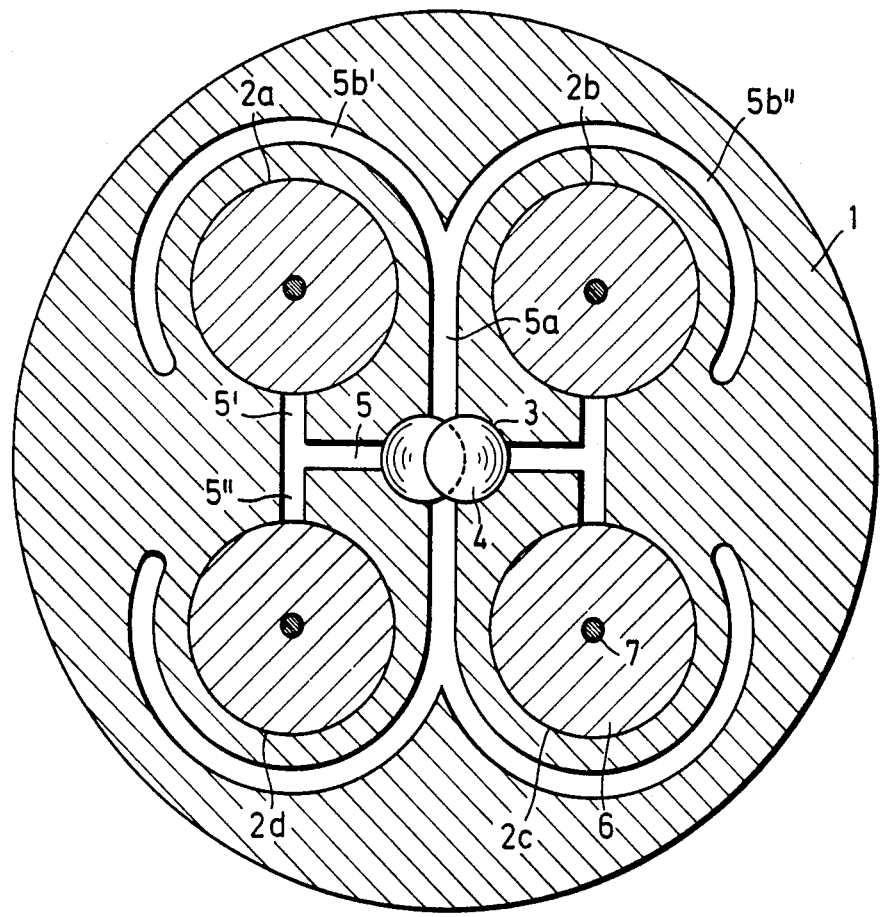
FIG. 2 is a cross-sectional view of a coupling arrangement for four pairs of associated optical waveguide ends.

FIG. 2 illustrates another arrangement of the type discussed above in connection with FIG. 1, only this time it is capable of simultaneously coupling four pairs of associated optical waveguide ends. Because of the similarity of these two coupling arrangements, the same or similar reference numerals have been used in FIG. 2 to identify parts corresponding to those of FIG. 1. The housing body 1 of FIG. 2 is provided with four first passages 2a, 2b, 2c and 2d which are regularly distributed, in the illustrated construction, at the corners of an imaginary square. The first passages 2a, 2b, 2c and 2d are basically circular in cross section and they serve for receiving and clamping the free ends of two optical waveguides each. At the center of the housing body 1, that is, substantially at the intersection of the diagonals of the above-mentioned imaginary square, there is arranged the second passage 3 in which there are accommodated the pressing bodies 4 in the manner discussed above. Several slots emanate from the second passage 3, among them the slots 5 which, at a certain distance from the second passage 3, are separated into individual slots 5' and 5'', so that each slot 5 establishes interconnection, via the slots 5' and 5'', with two associated first passages 2a, 2d or 2b, 2c. In this manner, all of the first passages 2a, 2b, 2c and 2d are connected with the second passage 3 by means of the respective slots 5, 5' and 5''.

In addition thereto, two further slots 5a extend from the second passage 3, each of which is subdivided, at a certain distance from the second passage 3, into two slots 5b' and 5b''. These slots 5a, 5b' and 5b'' extend along such courses that they respectively surround the associated ones of the first passages 2a, 2b, 2c and 2d at a predetermined distance therefrom. As shown in FIG. 2, the slots 5a, 5b' and 5b'' embrace the respectively associated first passages 2a, 2b, 2c and 2d along at least semi-cylindrical courses. In this manner, there is obtained a resiliently yieldable clamping portion between the respective slot 5a, 5b' or 5a, 5b'', as well as between the respective slot 5, 5' or 5, 5'', and the second passage 3, on the one hand, and the respective first passage 2a, 2b, 2c, or 2d, which clamping portion is capable of clamping the respective waveguide end when acted upon by the pressing bodies 4. FIG. 2 illustrates such waveguide ends as consisting of respective fibers 7 which are surrounded by tubular or sleeve-shaped connectors 6. The above-discussed slots 5, 5a, 5b, 5', 5'', 5b'' and 5b' are advantageously formed either by wire erosion, or by being electrochemically formed in the housing body 1 by a member having the desired contour.

It will be understood that each of the elements described above, or two or more together, may also find a useful application in other types of arrangements differing from the type described above.

While the invention has been illustrated and described as embodied in a coupling arrangement for optical waveguides, it is not intended to be limited to the details shown, since various modifications and structural changes may be made without departing from the spirit of the present invention in any way.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. An arrangement for coupling optical waveguide ends mounted in respective connectors, comprising a housing body having at least one first passage dimensioned for receiving the connectors of the optical waveguide ends in an end-to-end alignment, and at least one second passage parallel to and coextensive with said first passage; means for defining in said housing body at least one slot interconnecting said first and second passages and extending along an arcuate course therebetween to partially separate a clamping portion situated between said first and second passages from the remainder of the housing body; and a plurality of pressing bodies accommodated in said second passage and operative for pressing said clamping portion into clamping engagement with the connectors accommodated in said first passage.

2. The coupling arrangement as defined in claim 1, wherein said first passage is substantially cylindrical in conformity with the configurations of the connectors.

3. The coupling arrangement as defined in claim 1, wherein said slot has several bends between said first and second passages, all oriented in the same sense.

4. The coupling arrangement as defined in claim 1, wherein said slot has a first section which interconnects said first and second passages and opens into said second passage in a predetermined direction, and a second section forming a continuation of said first section across said second passage therefrom and extending in said predetermined direction.

5. The coupling arrangement as defined in claim 1, wherein said slot has a section which partially surrounds said first passage at a distance therefrom.

6. A method of manufacturing a housing body of an arrangement for coupling optical waveguide ends mounted in respective connectors, comprising the steps of forming the housing body with at least one first passage for receiving the connectors of the waveguide ends in an end-to-end alignment, and with at least one second passage parallel to and coextensive with the first passage and adapted to receive a plurality of pressing bodies; and subsequently providing in the housing body at least one slot interconnecting the first and second passages and extending along an arcuate course therebetween to partially separate a clamping portion situated between the first and second passages from the remainder of the housing body.

7. The method as defined in claim 6, wherein said providing step includes wire eroding.

8. The method as defined in claim 6, wherein said providing step includes electrochemically dissolving the material of the housing body along the arcuate course of the slot by a member having a contour conforming to the arcuate course.

* * * * *